United States Patent
Monnes et al.

(10) Patent No.: US 8,976,695 B2
(45) Date of Patent: Mar. 10, 2015

(54) WIRELESS COMMUNICATIONS SYSTEM HAVING SELECTIVE WIRELESS COMMUNICATIONS NETWORK AND RELATED METHODS

(75) Inventors: Peter Monnes, Chelmsford, MA (US); Yirong Meng, Bolton, MA (US)

(73) Assignee: Harris Corporation, Melbourne, FL (US)

( * ) Notice: Subject to any disclaimer, the term of this patent is extended or adjusted under 35 U.S.C. 154(b) by 141 days.

(21) Appl. No.: 13/592,662

(22) Filed: Aug. 23, 2012

(65) Prior Publication Data

US 2014/0056153 A1    Feb. 27, 2014

(51) Int. Cl.
H04W 24/00 (2009.01)
H04W 24/10 (2009.01)

(52) U.S. Cl.
CPC ................................. H04W 24/10 (2013.01)
USPC .......... 370/252; 370/328; 370/329; 455/432.3

(58) Field of Classification Search
CPC ....... H04W 40/12–40/20; H04W 48/17–48/20
USPC .............. 370/248–252, 310.2, 328, 331–333, 370/338–339; 455/432.3, 435.2
See application file for complete search history.

(56) References Cited

U.S. PATENT DOCUMENTS

| | | | |
|---|---|---|---|
| 6,035,196 A | 3/2000 | Hengeveld et al. | |
| 7,231,183 B2 | 6/2007 | Pauli et al. | |
| 7,602,782 B2 | 10/2009 | Doviak et al. | |
| 7,610,057 B2 | 10/2009 | Bahl et al. | |
| 7,613,171 B2* | 11/2009 | Zehavi et al. | 370/352 |
| 7,706,292 B2* | 4/2010 | Nakano et al. | 370/247 |
| 8,379,532 B2* | 2/2013 | Griff et al. | 370/252 |
| 8,565,766 B2* | 10/2013 | Scherzer et al. | 455/435.2 |
| 2004/0218605 A1 | 11/2004 | Gustafsson et al. | |
| 2006/0039346 A1 | 2/2006 | Shapiro | |
| 2007/0104128 A1 | 5/2007 | Laroia et al. | |
| 2007/0265000 A1 | 11/2007 | Hanson et al. | |
| 2010/0003975 A1 | 1/2010 | Barankanira et al. | |
| 2010/0080174 A1* | 4/2010 | Zhu et al. | 370/328 |
| 2011/0202641 A1* | 8/2011 | Kahn et al. | 709/221 |
| 2011/0305153 A1* | 12/2011 | Lee et al. | 370/252 |

OTHER PUBLICATIONS

Netmotion Wireless, Mobile Virtual Private Network (VPN), 2011, pp. 1 of 1.
Netmotion Wireless, Core Functionality of Mobility XE Mobile VPN Software, 2011, pp. 1-5.

(Continued)

Primary Examiner — Charles C Jiang
Assistant Examiner — Mohamed Kamara
(74) Attorney, Agent, or Firm — Allen, Dyer, Doppelt, Milbrath & Gilchrist, P.A.

(57) ABSTRACT

A wireless communications system may include different wireless communications networks, an application server, and an intermediate server configured to communicate with the application server. The wireless communications system may also include a mobile wireless communications device configured to communicate with the intermediate server over each of the different wireless communications networks to determine a selected wireless communications network. The mobile wireless communications device may also be configured to communicate with the application server via the intermediate server over the selected wireless communications network.

20 Claims, 7 Drawing Sheets

(56) References Cited

OTHER PUBLICATIONS

Netmotion Wireless, Stay Connected with Mobility XE, 2011, pp. 1-2.

Chowdhury et al., Priority Based Interface Selection for Overlaying Heterogeneous Networks, 2011, pp. 1-7.

Harris Corporation, Harris Corporation Offers Public Safety Community Seamless, Secure Roaming Between Private and Public Broadband Networks, 2012, pp. 1 of 1.

* cited by examiner

WIRELESS COMMUNICATIONS SYSTEM HAVING SELECTIVE WIRELESS COMMUNICATIONS NETWORK AND RELATED METHODS

FIELD OF THE INVENTION

The present invention relates to the field of wireless communications, and, more particularly, to wireless communications systems and related methods.

BACKGROUND OF THE INVENTION

Mobile communication systems continue to grow in popularity and have become an integral part of both personal and business communications. A mobile communication system may allow internet access via a cellular network, a wireless local area network (WLAN), and/or other type of private or public network, for example. Thus, data service may become available to a mobile wireless communication device, for sending and receiving emails, browsing different websites, placing an internet phone call, streaming video from internet, etc.

When multiple wireless networks are available for communication with the mobile wireless communications device, it may be desirable to select the wireless network having increased performance with respect to the other available wireless networks. For example, based upon a location of the mobile wireless communications device and other conditions, a wireless network may be chosen that may be known to have reduced network congestion and coverage gaps.

Current approaches for selecting a wireless network from among multiple available wireless networks typically use passively measured criteria. For example, a mobile wireless communications device may use criteria such as signal strength, location, and historical data along with statically defined weighing criteria to rate performance of a wireless network. For a currently active connection, that is, the wireless network currently being used by the mobile wireless communications device for communications, other measurements, such as, for example, packet loss and jitter may be used. Passive measurements, especially for wireless networks that are not active, may not provide an accurate picture of the performance of the available wireless networks to the mobile wireless communications device.

U.S. Pat. No. 7,610,057 to Bahl et al. discloses a system for selecting a wireless network on a device capable of communicating with multiple wireless networks. More particularly, a virtual coexistence driver (VCD) obtains operational information regarding active network interfaces. The VCD determines a congestion/interference (C/I) metric for each channel and selects a channel for the same wireless network based upon the C/I metric. If another channel for the same wireless technology is unavailable, an alternative network is selected.

U.S. Pat. No. 6,035,196 to Hengeveld et al. is directed to automatic cell transfer based upon reverse channel characteristics. More particularly, one or more of the reverse channel parameters of a reverse channel between a mobile device and a base station are measured and assessed against one or more thresholds. The mobile device searches for a second base station based upon the one or more measured transmission parameters as compared to one or more of the thresholds.

SUMMARY OF THE INVENTION

In view of the foregoing background, it is therefore an object of the present invention to provide a communications system that includes a mobile wireless communications device communicating with an application server over a selected wireless communications network.

This and other objects, features, and advantages in accordance with the present invention are provided by a wireless communications system that includes a plurality of different wireless communications networks, an application server, and an intermediate server configured to communicate with the application server. The wireless communications system also includes a mobile wireless communications device configured to communicate with the intermediate server over each of the plurality of different wireless communications networks to determine a selected wireless communications network. The mobile wireless communications device is also configured to communicate with the application server via the intermediate server over the selected wireless communications network.

The wireless communications system may more accurately determine which one of available wireless communications networks to a mobile wireless communications device provides increased performance and switches communications to that wireless communications network through an active approach. For example, in one embodiment, the mobile wireless communications device may be configured to pass test data through the intermediate server and analyze the test data, for example. The mobile wireless communications device may also be configured to generate scoring data based upon the analyzed test data to determine the selected wireless communications network. The analyzed test data may relate to at least one of a round trip ping time, a packet burst rate, and a signal quality, for example.

In another embodiment, the intermediate server may be configured to pass test data through the mobile wireless device and analyze the test data. The intermediate server may also be configured to generate scoring data based upon the analyzed test data and send the scoring data back to the mobile wireless device to determine the selected wireless communications network.

The mobile wireless communications device may be further configured to determine the selected wireless communications network based upon at least one of geographic location, a time of day, and a defined wireless communications network priority, for example. The mobile wireless communications device may include a controller and a plurality of different wireless network interfaces coupled thereto. The mobile wireless communications device and the application server may communicate via the intermediate server as a virtual private network (VPN), for example.

A method aspect is directed to communicating between a mobile wireless communications device and an application server. The method includes communicating, using the mobile wireless communications device, with an intermediate server over each of a plurality of different wireless communications networks to determine a selected wireless communications network. The method also includes communicating, using the mobile wireless communications device, with the application server via the intermediate server over the selected wireless communications network.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
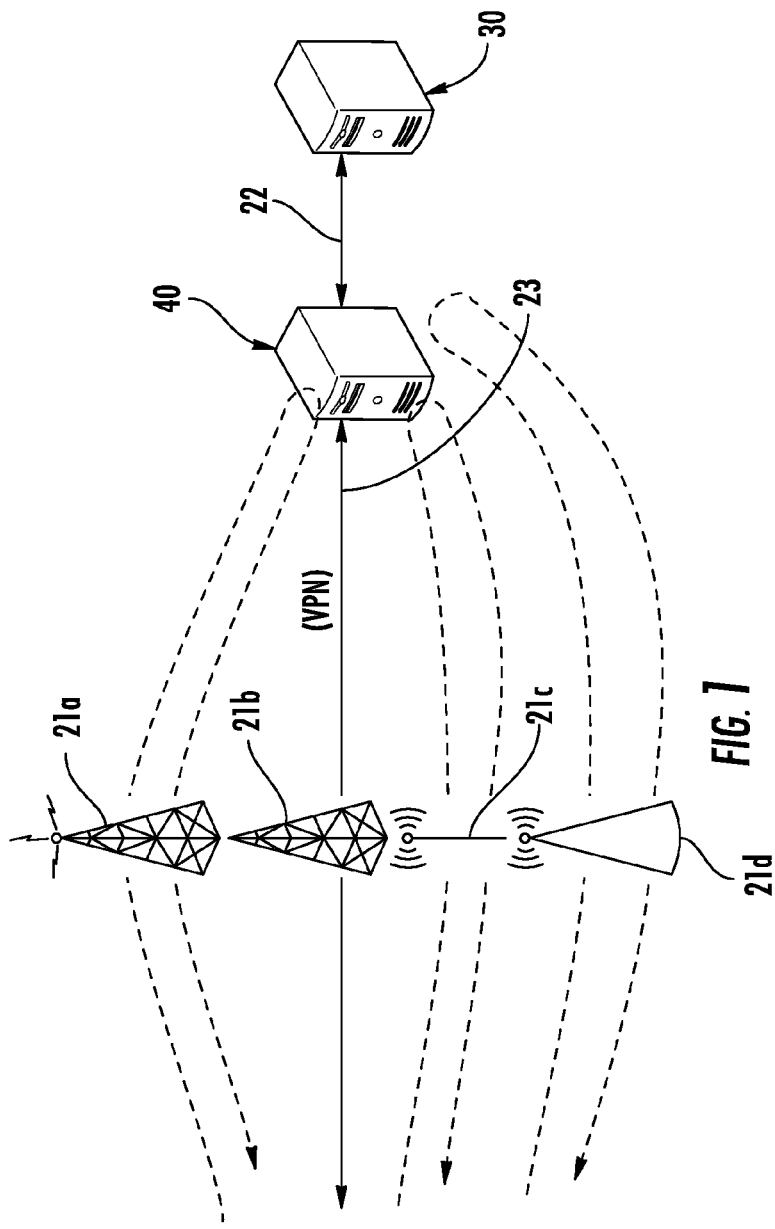
FIG. 1 is a schematic view of a wireless communications system in accordance with the present invention.
Figure 1:
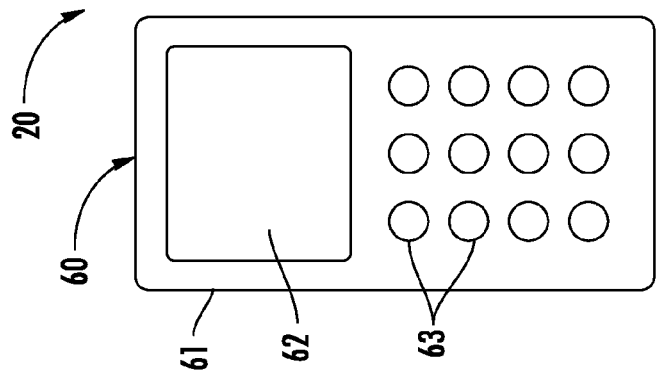
Figure 2:
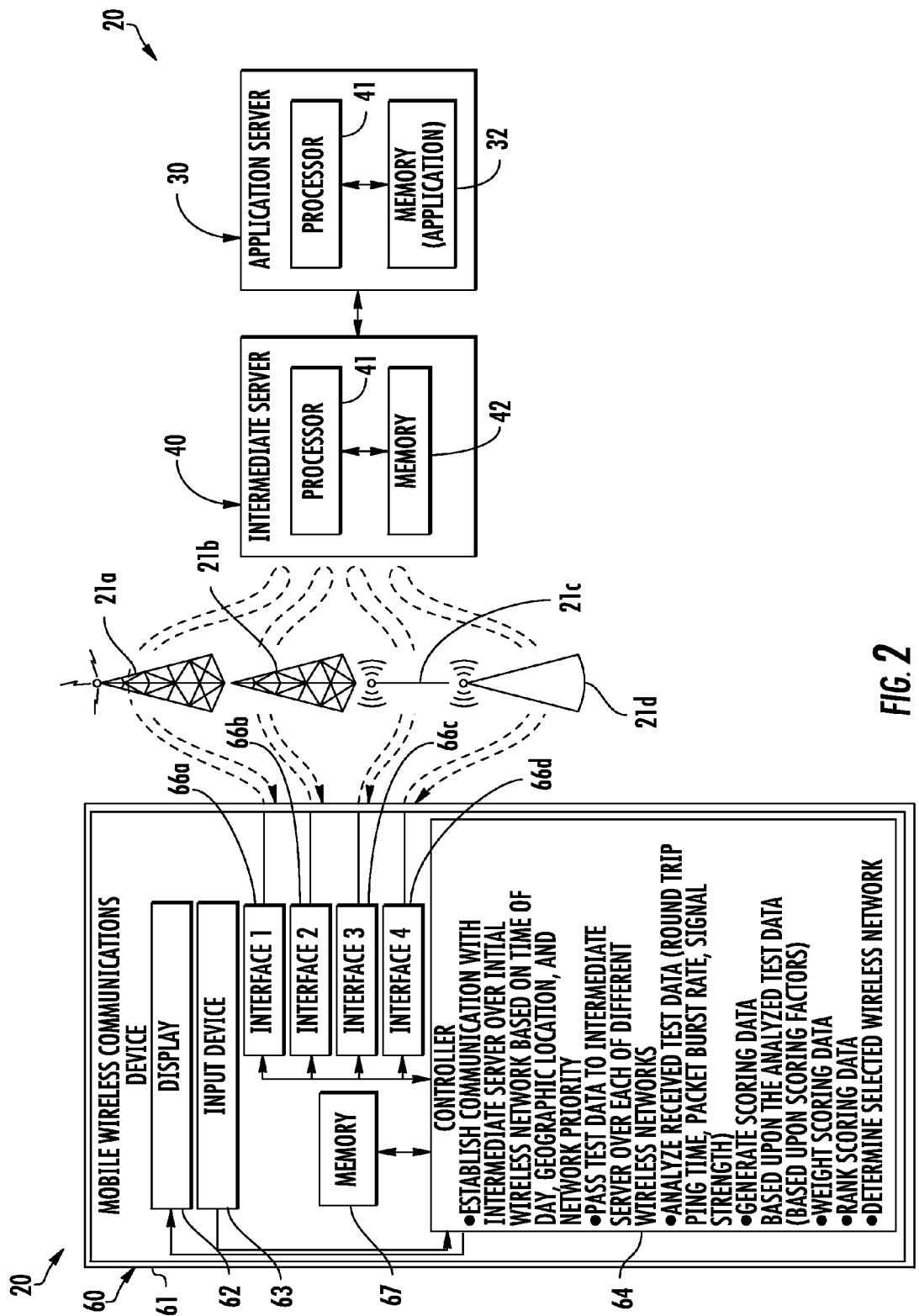
FIG. 2 is a more detailed schematic block diagram of the wireless communications system of FIG. 1.
Figure 3:
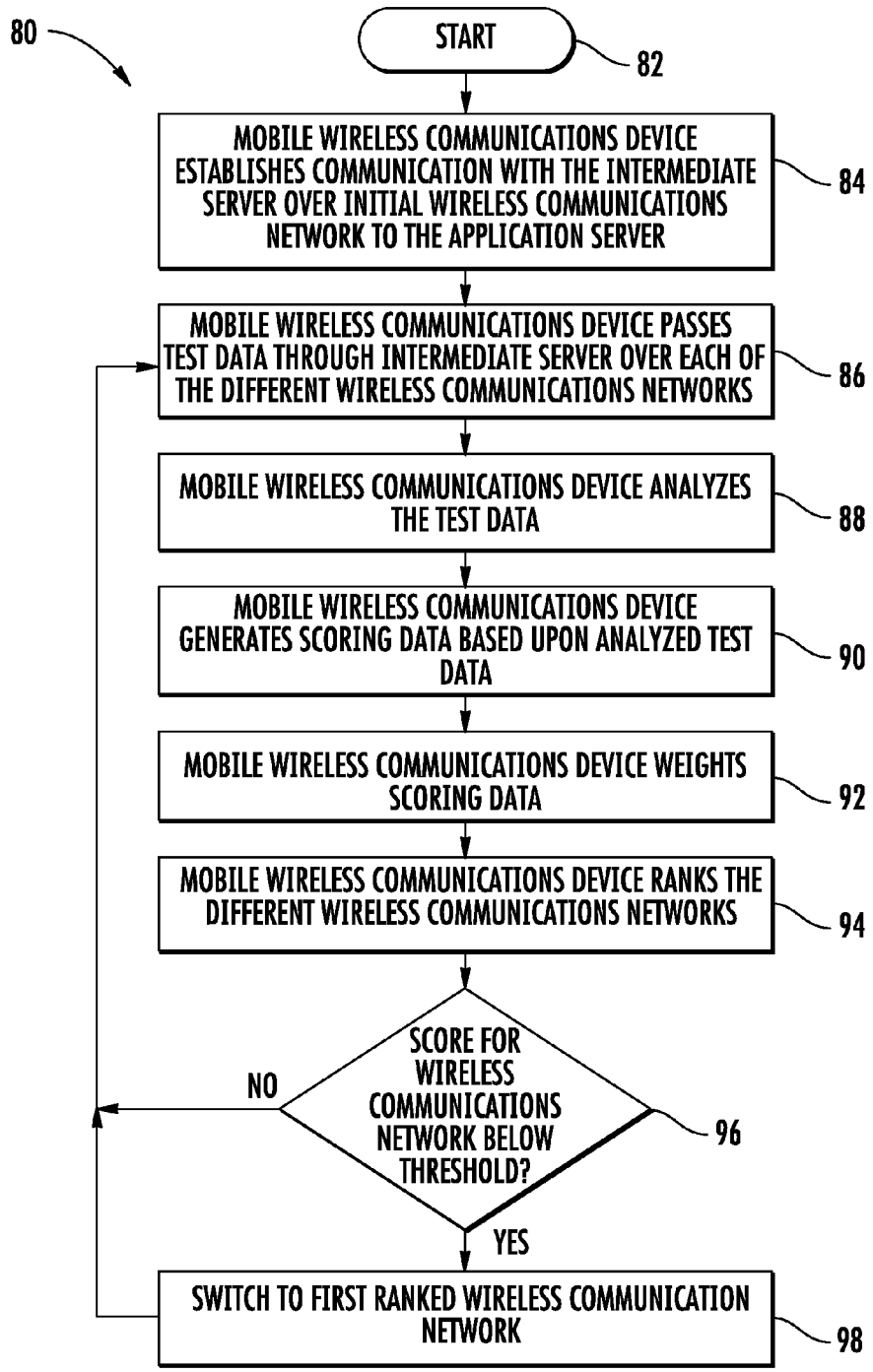
FIG. 3 is a flowchart of a method of communicating using the wireless communications device of FIG. 2.

Referring initially to FIGS. 1 and 2, and beginning at Block 82 of the flowchart 80 in FIG. 3, a wireless communications system 20 and a corresponding method of communicating are described. The wireless communications system 20 includes different wireless communications networks 21a-21d. The different wireless communications networks 21a-21d may include one or more of a cellular network and a Wi-Fi network, for example. The different wireless communications networks may also include both public and private communications networks. Of course, while four wireless communications networks are illustrated, the wireless communications system 20 may include any number of wireless communications networks.

The wireless communications system also includes an application server 30 and an intermediate server 40 configured to communicate with the application server. The application server 30 communicates with the intermediate server 40 over a network 22, for example, the Internet.

The application server 30 includes a processor 31 and memory 32 coupled thereto. One or more applications may be stored in the memory 32, for example, a web application. Of course, other types of applications can be run on the application server 30.

The intermediate server 40 is coupled to each of the different wireless networks 21a-21d. The intermediate server 40 also includes a processor 41 and a memory 42 coupled thereto. In other words, the intermediate server 40 functions as a gateway to the application server 30, and may perform additional functions, as will be described in further detail below. The wireless communications system 20 also includes a mobile wireless communications device 60. The mobile wireless communications device 60 illustratively includes a housing 61, a display 62, and an input device 63, for example, input keys, each carried by the housing. The mobile wireless communications device 60 also includes a controller 64, and different wireless network interfaces 66a-66d coupled to the controller. The different wireless network interfaces 66a-66d may define wireless transceiver circuitry, for example, and may cooperate with the controller 64 to communicate data, for example, for an application, via a respective wireless network 21. Of course, a given wireless network interface 66a-66d may correspond to more than one wireless network. For example, each network interface 66a-66d may be able to access different networks which are in the same technology category, but provided by different service providers. A memory 67 is also coupled to the controller 64.

More particularly, the mobile wireless communications device 60, via the controller 64, establishes communication with the intermediate server 50 over an initial one 21b of the different wireless networks 21a-21d to the application server 30 (Block 84). The connection 23 between the mobile wireless communications device 60 and the application server 30 may be considered a virtual connection or communicate as a virtual private network (VPN), for example, a mobile VPN.

The mobile wireless communications device 60 may select the initial wireless network 21b based upon any of a time of day, a geographic location, and a defined wireless communications network priority. The communications network priority may be based upon the type of communications network, for example. By way of example, one or more of the wireless networks 21a, 21c-21d may be known to have decreased performance during peak usage hours, and thus, the mobile wireless communications device 60 may select the initial wireless network 21b.

The mobile wireless communications device 60, for example, after the initial wireless communications network has been selected, communicates with each of the different wireless communications networks 21a-21d (Block 86). More particularly, in this embodiment, the mobile wireless communications device 60 passes test data through the intermediate server 40 over each of the different wireless communications networks 21a-21d. For example, the mobile wireless communications device 60 may ping the intermediate server 40. The test data is passed from the intermediate server 40 back to the mobile wireless communications device 60. The mobile wireless communications device 60 analyzes the received test data (Block 88). For example, the received test data may be analyzed to determine a quality of each of the different wireless communications networks. The analyzed test data may relate to one or more a round trip ping time (i.e., delay), a packet burst rate, and a signal quality. Signal quality may include, for example, signal strength, jitter, and bit error rate. Of course, the analyzed test data may relate to other or additional measurement metrics.

In some embodiments, the mobile wireless communications device 60 may not communicate with all of the different wireless networks, but instead, a subset of them. For example, if a given wireless communications network is known to have decreased performance in a geographical area of the mobile wireless communications device 60, the mobile device will not attempt to communicate with that wireless network. This reduces network traffic and also reduces power consumption of the mobile wireless communications device 60.

The mobile wireless communications device 60 generates scoring data based upon the analyzed test data (Block 90). More particularly, the mobile wireless communications device 60 generates a network score for each of the different wireless communications networks 21a-21d, including the wireless communications network currently being used to communicate with the application server 30.

The mobile wireless communications device 60 may generate the scoring data also based upon scoring factors, for example, a time of day, a geographical location of the mobile wireless communications device 60, a proximity to a known wireless communications dead spot, user preferences (i.e., Wi-Fi over cellular), and/or other historical data. Of course, other factors may be used to generate the scoring data or network score, for example, user preferences or rules.

Additionally, the mobile wireless communications device 60 may weight the generated scoring data (Block 92). More particularly, the mobile wireless communications device 60 may associate a weight with each of the above-noted scoring factors. For example, each type of wireless network connection (Wi-Fi, cellular) may have a weight for each of the scoring factors. By way of example, round trip time may be a relatively poor indicator of long term evolution (LTE) degradation, and thus may be given a lower weight. The mobile wireless communications device 60 ranks the different wireless networks based upon the weighted scoring data to determine a selected wireless communications network (Block 94).

The mobile wireless communications device 60 determines a selected wireless communications network based upon the ranking. More particularly, the mobile wireless communications device 60 may switch from the initial wireless communications network 21*b* to the selected wireless communication network to communicate with the application server 40. For example, the wireless communications device 60 may switch to the first ranked, i.e., highest score, wireless communications network if it is not the initial wireless communications network 21*b*. Switching to another wireless communications network (Block 98) may occur if the corresponding wireless communications network score, i.e., scoring data, falls below a predetermined threshold, for example (Block 96). If the network score is not below the threshold, then scores may be recalculated by again passing test data to the intermediate server 40 (Block 86).

The mobile wireless communications device 60 may pass test data to the intermediate server 40 at regular intervals over each of the different wireless communications networks 21*a*-21*d*, for example, every minute. Of course, other intervals or periods may be used, or the passing of the test data may be random. Alternatively, or additionally, the passing of the test data may be based upon other criteria, for example, geographic location, time of day, or other criteria. Advantageously, by continually passing the test data to the intermediate server 40, the mobile wireless communications device 60 may determine, and switch to, a most suitable wireless communications network for communicating with the application server 30 via the intermediate server 40 based upon changing network conditions, for example. Moreover, while the initial wireless communications network 21*b* has been selected as described above, it will be appreciated that the passing and analysis of test data and the generation of scoring data may also be applicable for selecting the initial wireless communications network.

In some embodiments, the controller 64 of the mobile wireless communications device 60 may inform the user of the change to the selected mobile wireless communications network, for example, via the display 62. Of course, the user may be notified by another output device, or may not be notified at all.

Figure 4:
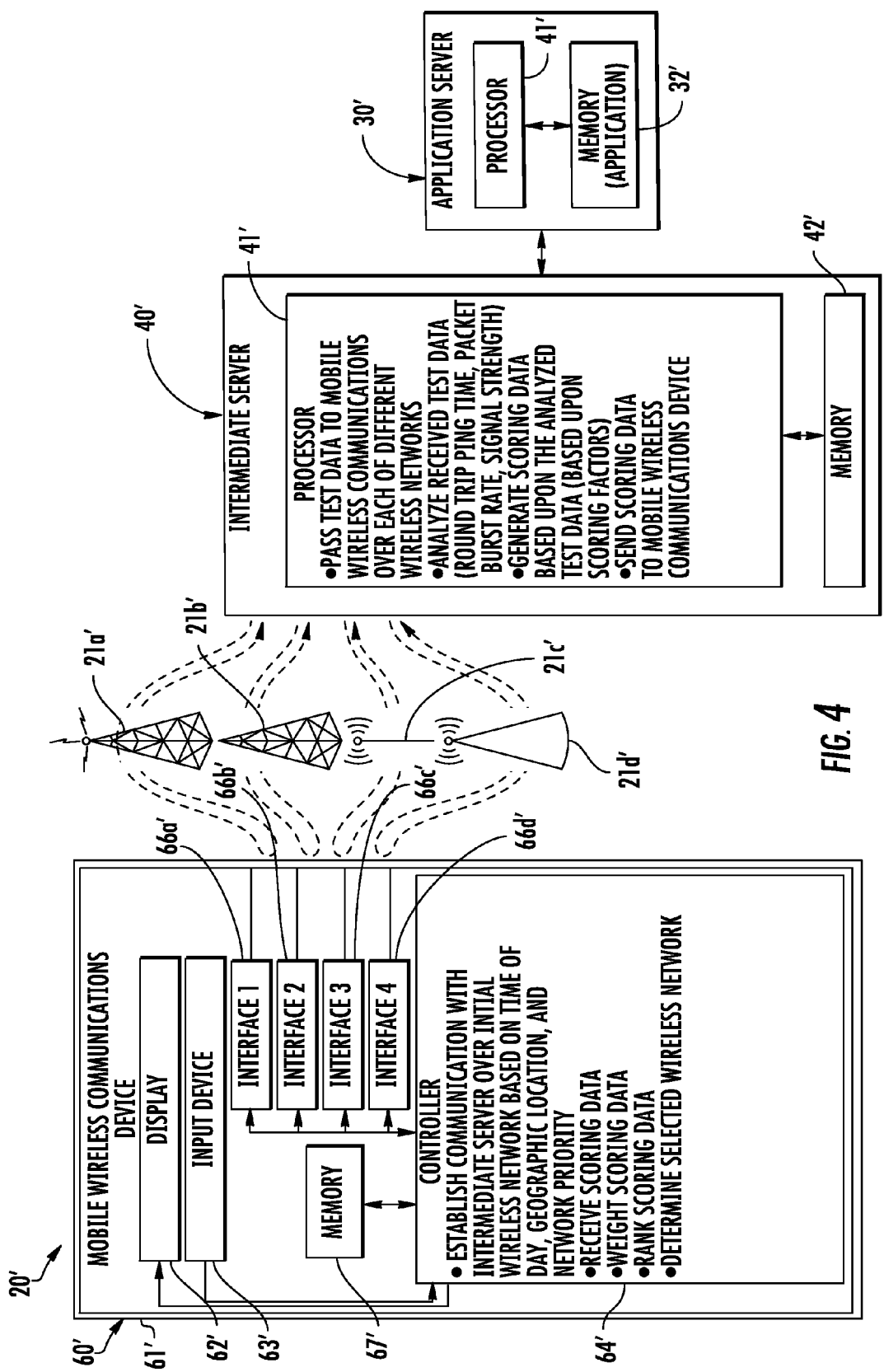
FIG. 4 is a detailed schematic block diagram of the wireless communications system in accordance with another embodiment of the present invention.
Figure 5:
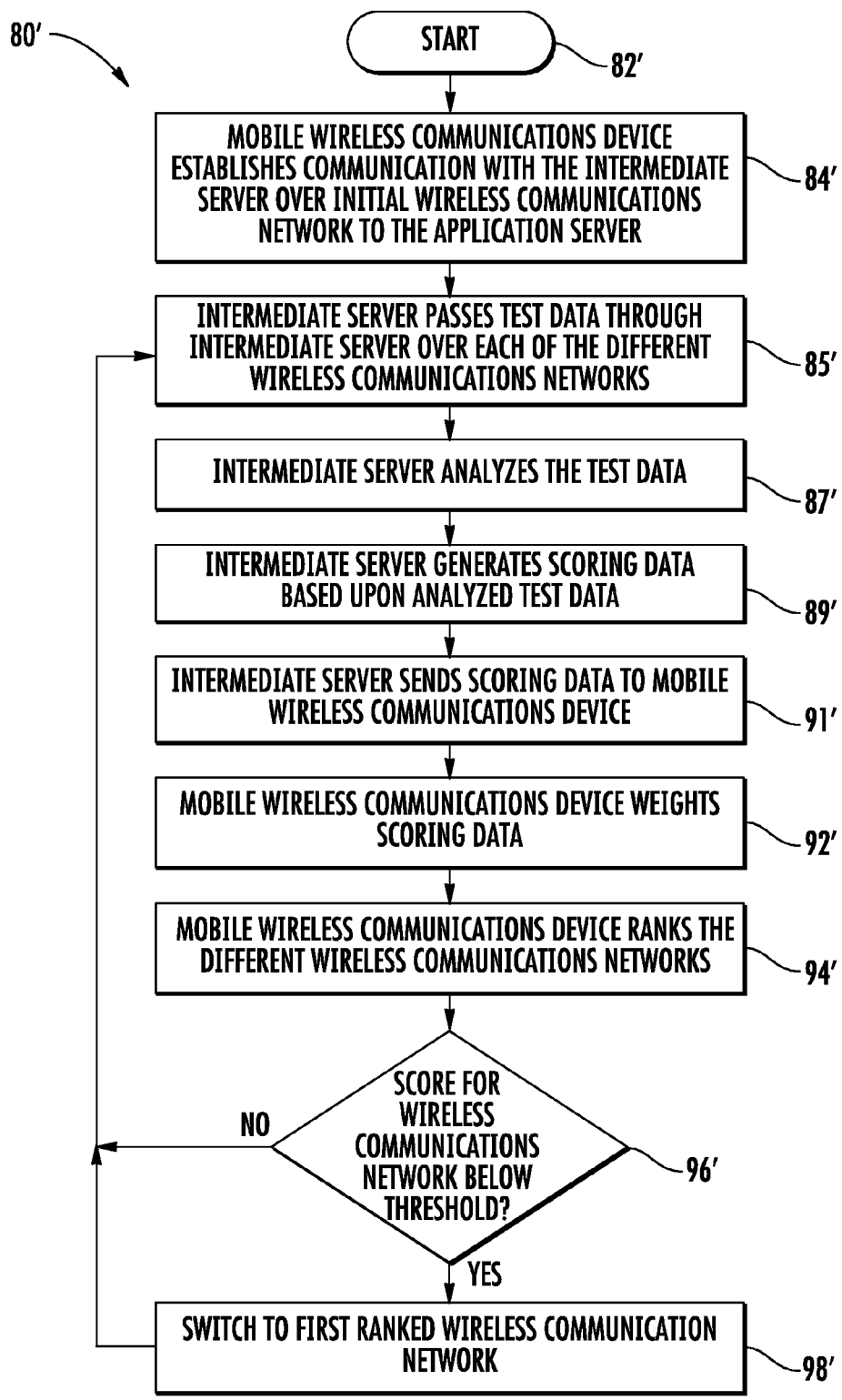
FIG. 5 is a flowchart of a method of communicating using the intermediate server and the mobile wireless communications device of FIG. 4.

Referring now to FIG. 4 and beginning at Block 82' in the flowchart 80' of FIG. 5, in another embodiment, the mobile wireless communications device 60' does not pass test data through the intermediate server 40'. Instead, it is the intermediate server 40' that passes test data through the mobile wireless communications device 60' (Block 85') in a similar fashion to that in the above-described embodiment. More particularly, the intermediate server 40' analyzes the test data (Block 87') and generates scoring data (Block 89') much in the same way as the mobile wireless communications device 60 described above. However, the intermediate server 40' sends the scoring data back to the mobile wireless communications device 60' (Block 91') which weights the scoring data (Block 92') and ranks the different wireless communications networks 21*a*'-21*d*' (Block 94'). The scoring data may be weighted by the intermediate server 40'. If the weighted network score is below the threshold, the mobile wireless communications device 60' (Block 96'), switches to the wireless communications network (Block 98') having the highest rank, i.e., based upon the scoring data, or ranking, for communicating with the application server 40'. Test data is sent again to obtain an updated status of the wireless communications networks 21*a*'-21*d*'.

Figure 6:
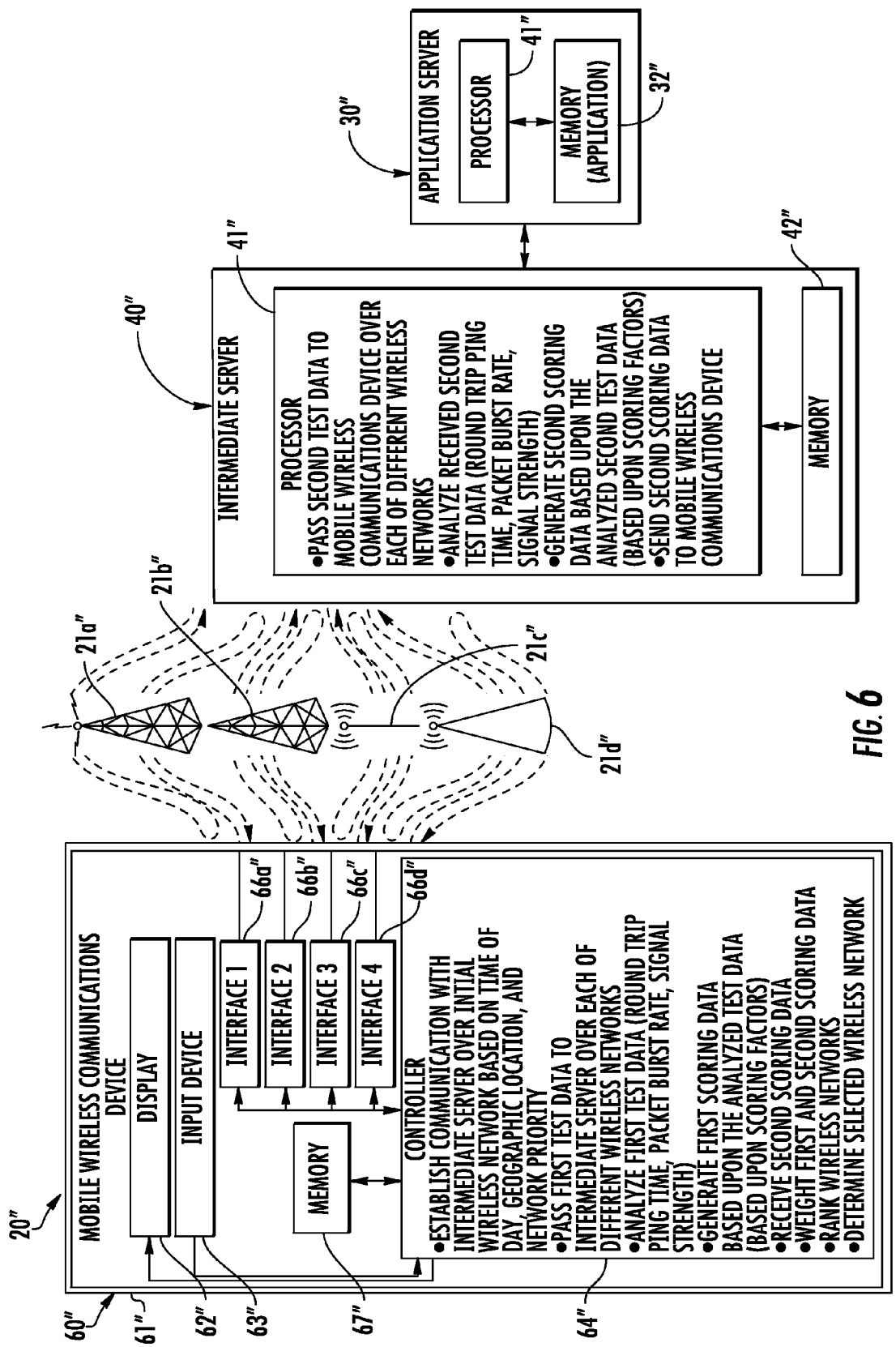
FIG. 6 is a detailed schematic block diagram of the wireless communications system in accordance with yet another embodiment of the present invention.
Figure 7:
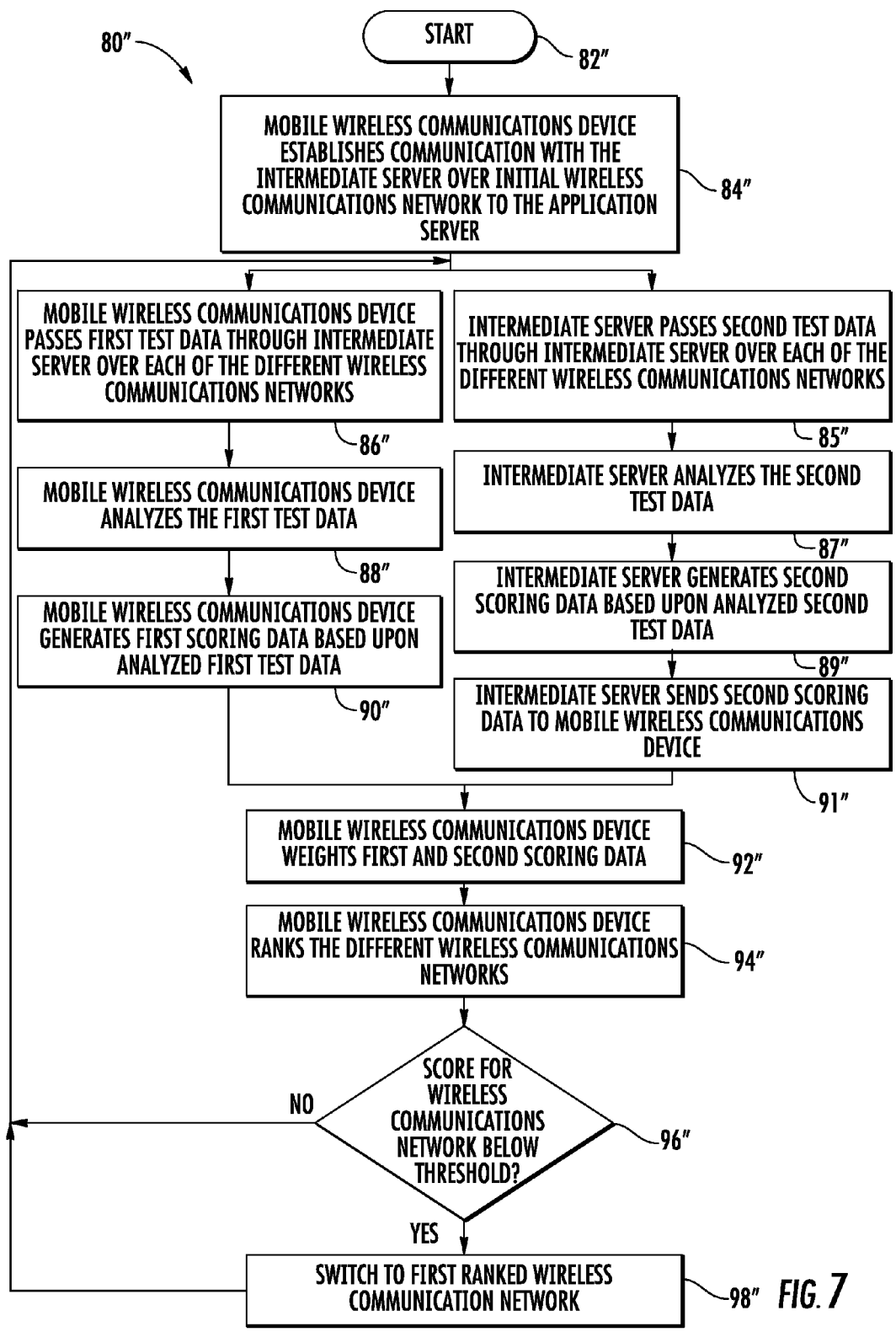
FIG. 7 is a flowchart of a method of communicating using the intermediate server and the mobile wireless communications device of FIG. 6.

Referring now to FIG. 6 and beginning at Block 82" in the flowchart 80" of FIG. 7, in yet another embodiment, the mobile wireless communications device 60" and the intermediate server 40" cooperate for selecting the wireless communications network 21". In other words, the functionality of the mobile wireless communications device 60 described above with reference to FIGS. 1-3 and the functionality of the intermediate server 40' described above with respect to FIGS. 4 and 5 are combined.

More particularly, the mobile wireless communications device 60" passes first test data to the intermediate server 40" (Block 86"), analyzes the first test data (Block 88") returned from the intermediate server, and generates first scoring data based upon the analyzed first test data (Block 90"). The intermediate server 40" passes second test data to the mobile wireless communications device 60" (Block 85"), analyzes the second test data returned from the mobile wireless communications device 60" (Block 87"), and generates second scoring data based upon the analyzed second test data (Block 89"). The intermediate server 40" sends the second scoring data back to the mobile wireless communications device 60" (Block 91"). The mobile wireless communications device 60" determines the selected wireless communications network 21" based upon the first and second scoring data. For example, the mobile wireless communications device 60" may average the first and second scoring data to select the wireless communications network 21". The mobile wireless communications device 60" may weight the combined scoring data, or independently weight the scoring data (Block 92"). Alternatively or additionally, the mobile wireless communications device 60" may perform other operations thereon, for example, execute a selection algorithm, to select the wireless communications network. If the score for the current wireless communication network 21*b*" is below the threshold (Block 96"), the mobile wireless communications device 60" switches to the network having the highest score or rank (Block 98"). Of course, the process or sending test data (Blocks 85" and 86") is repeated both after a wireless communications network switch is made and if the score for the current wireless network 21*b*" is above the threshold.

A method aspect is directed to communicating between a mobile wireless communications device 60 and an application server 30. The method includes using the mobile wireless communications device 60 to communicate with an intermediate server 40 over each of a plurality of different wireless communications networks 21*a*-21*d* to determine a selected wireless communications network. The method also includes using the mobile wireless communications device 60 to communicate with the application server 30 via the intermediate server 40 over the selected wireless communications network.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A wireless communications system comprising:
a plurality of different wireless communications networks;
an application server;
an intermediate server configured to communicate with said application server; and
a mobile wireless communications device configured to
pass first test data through said intermediate server over each of said plurality of different wireless communications networks,
analyze the first test data, and
generate first scoring data based upon the analyzed first test data;
said intermediate server configured to
pass second test data through said mobile wireless device,
analyze the second test data,
generate second scoring data based upon the analyzed second test data, and
send the second scoring data back to said mobile wireless device;
said mobile wireless communications device further configured to
determine a selected wireless communications network based upon the first and second scoring date, and
communicate with said application server via said intermediate server over the selected wireless communications network.

2. The wireless communications system of claim 1, wherein the analyzed first test data relates to at least one of a round trip ping time, a packet burst rate, and a signal quality.

3. The wireless communications system of claim 1, wherein the analyzed first and second test data relates to at least one of a round trip ping time, a packet burst rate, and a signal quality.

4. The wireless communications system of claim 1, wherein said mobile wireless communications device is further configured to determine the selected wireless communications network also based upon at least one of geographic location, a time of day, and a defined wireless communications network priority.

5. The wireless communication system of claim 1, wherein said mobile wireless communications device comprises a controller and a plurality of different wireless network interfaces coupled thereto.

6. The wireless communication system of claim 1, wherein said mobile wireless communications device and said application server communicate via said intermediate server as a virtual private network (VPN).

7. A mobile wireless communications device for communicating with an intermediate server over a plurality of different wireless communications networks, the intermediate server being configured to communicate with an application server, the mobile wireless communications device comprising:
a housing;
a plurality of different wireless network interfaces carried by said housing;
a controller coupled to said plurality of different wireless network interfaces and configured to
pass first test data through the intermediate server over each of the plurality of different wireless communications networks,
analyze the first test data,
generate first scoring data based upon the analyzed first test data,
determine a selected wireless communications network based upon the first scoring data and second scoring data received from the intermediate server, the second scoring data being generated by the intermediate server based upon analyzed second test data passed through the mobile wireless communications device, and
communicate with the application server via the intermediate server over the selected wireless communications network.

8. The mobile wireless communications device of claim 7, wherein the analyzed first test data relates to at least one of a round trip ping time, a packet burst rate, and a signal quality.

9. The mobile wireless communications device of claim 7, wherein said controller is further configured to determine the selected wireless communications network also based upon at least one of geographic location, a time of day, and a defined wireless communications network priority.

10. A method of communicating between a mobile wireless communications device and an application server, the method comprising:
communicating using the mobile wireless communications device first test data through an intermediate server over each of a plurality of different wireless communications networks;
analyzing using the mobile wireless communications device the first test data;
generating first scoring data using the mobile wireless communications device based upon the analyzed first test data;
determine using the mobile wireless communications device a selected wireless communications network based upon the first scoring data and second scoring data received from the intermediate server, the second scoring data being generated by the intermediate server based upon analyzed second test data passed through the mobile wireless communications device; and
communicating using the mobile wireless communications device with the application server via the intermediate server over the selected wireless communications network.

11. The method of claim 10, wherein analyzing the first test data comprises analyzing first test data relating to at least one of a round trip ping time, a packet burst rate, and a signal quality.

12. The method of claim 10, wherein communicating with the intermediate server over each of the plurality of different wireless communications networks comprises communicating with the intermediate server over each of the plurality of different wireless communications networks to determine the selected wireless communications network also based upon at least one of geographic location, a time of day, and a defined wireless communications network priority.

13. A wireless communications system comprising:
a plurality of different wireless communications networks;
an application server;
an intermediate server configured to communicate with said application server; and
a mobile wireless communications device configured to
communicate with said intermediate server over each of said plurality of different wireless communications networks to determine a selected wireless communications network, and communicate with said application server via said intermediate server over the selected wireless communications network;

said intermediate server further configured to
pass test data through said mobile wireless communications device,
analyze the test data,
generate scoring data based upon the analyzed test data, and
send the scoring data back to said mobile wireless communications device to determine the selected wireless network.

14. The wireless communications system of claim 13, wherein the analyzed test data relates to at least one of a round trip ping time, a packet burst rate, and a signal quality.

15. The wireless communications system of claim 13, wherein said mobile wireless communications device is further configured to determine the selected wireless communications network based upon at least one of geographic location, a time of day, and a defined wireless communications network priority.

16. The wireless communication system of claim 13, wherein said mobile wireless communications device comprises a controller and a plurality of different wireless network interfaces coupled thereto.

17. The wireless communication system of claim 13, wherein said mobile wireless communications device and said application server communicate via said intermediate server as a virtual private network (VPN).

18. A mobile wireless communications device for communicating with an intermediate server over a plurality of different wireless communications networks, the intermediate server being configured to communicate with an application server, the mobile wireless communications device comprising:
a housing;
a plurality of different wireless network interfaces carried by said housing;
a controller coupled to said plurality of different wireless network interfaces and configured to
pass test data through the intermediate server over each of the plurality of different wireless communications networks,
pass test data received from the intermediate server back to the intermediate server for analysis and generation of scoring data based upon the analyzed test data,
receive the scoring data back from the intermediate server mobile wireless device to determine a selected wireless communications network, and
communicate with the application server via the intermediate server over the selected wireless communications network.

19. The mobile wireless communications device of claim 18, wherein the analyzed test data relates to at least one of a round trip ping time, a packet burst rate, and a signal quality.

20. The mobile wireless communications device of claim 18, wherein said controller is further configured to determine the selected wireless communications network based upon at least one of geographic location, a time of day, and a defined wireless communications network priority.

* * * * *